US012005388B2

(12) United States Patent
Centner et al.

(10) Patent No.: US 12,005,388 B2
(45) Date of Patent: Jun. 11, 2024

(54) APPARATUS AND METHODS FOR AIR FILTRATION OF HVAC SYSTEMS

(71) Applicant: Smart Material Printing B.V., Enschede (NL)

(72) Inventors: Olivier Centner, Toronto (CA); Gregor Luthe, Gronau (DE); Sean Casey, Toronto (CA); Thomas Arthur Brooks, Ontario (CA)

(73) Assignee: Smart Material Printing B.V., Enschede (NL)

( * ) Notice: Subject to any disclaimer, the term of this patent is extended or adjusted under 35 U.S.C. 154(b) by 0 days.

(21) Appl. No.: 18/225,928

(22) Filed: Jul. 25, 2023

(65) Prior Publication Data

US 2024/0123390 A1    Apr. 18, 2024

Related U.S. Application Data

(60) Provisional application No. 63/392,219, filed on Jul. 26, 2022.

(51) Int. Cl.
*B01D 53/02* (2006.01)
*B01D 46/00* (2022.01)
(Continued)

(52) U.S. Cl.
CPC ......... *B01D 51/08* (2013.01); *B01D 46/0027* (2013.01); *F24F 8/108* (2021.01);
(Continued)

(58) Field of Classification Search
CPC ............... B01D 51/08; B01D 46/0027; B01D 2273/24; B01D 2279/50; F24F 8/108; F24F 2110/64
See application file for complete search history.

(56) References Cited

U.S. PATENT DOCUMENTS

| 4,108,759 A | 8/1978 | Young |
| 4,307,964 A | 12/1981 | Dudgeon et al. |

(Continued)

FOREIGN PATENT DOCUMENTS

| CA | 2097070 | 5/1992 |
| CN | 1334755 | 2/2002 |

(Continued)

OTHER PUBLICATIONS

International Search Report for International Application No. PCT/EP2019/000293 filed on Oct. 14, 2019 on behalf of Smart Material Printing B.V. Mail Date: Jan. 22, 2020. 6 pages (English translation and German language original).

(Continued)

*Primary Examiner* — Christopher P Jones
(74) *Attorney, Agent, or Firm* — Weiss & Arons LLP

(57) ABSTRACT

A particle agglomeration system for improving filtering capacity of an HVAC system is disclosed. The system may include a first plate. The first plate may include a first sound generator. The system may include a second plate. The second plate may include a second sound generator. The system may include a frame. The frame may be configured to position the first plate relative to the second plate. A standing sound wave may be formable between the first sound generator and the second sound generator.

18 Claims, 6 Drawing Sheets

(51) Int. Cl.
*B01D 51/08* (2006.01)
*F24F 8/108* (2021.01)
*F24F 110/64* (2018.01)

(52) U.S. Cl.
CPC ...... *B01D 2273/24* (2013.01); *B01D 2279/50* (2013.01); *F24F 2110/64* (2018.01)

(56) References Cited

U.S. PATENT DOCUMENTS

| | | | |
|---|---|---|---|
| 4,759,775 | A | 7/1988 | Peterson et al. |
| 4,893,886 | A * | 1/1990 | Ashkin ............... G01N 15/10 359/350 |
| 5,225,089 | A | 7/1993 | Benes et al. |
| 5,527,460 | A | 6/1996 | Trampler et al. |
| 5,769,913 | A | 6/1998 | Gallego et al. |
| 5,827,350 | A | 10/1998 | Magill et al. |
| 5,902,487 | A | 5/1999 | Pickering et al. |
| 5,902,489 | A * | 5/1999 | Yasuda ................ B01J 19/10 96/155 |
| 5,902,849 | A | 5/1999 | Heucher et al. |
| 6,224,652 | B1 | 5/2001 | Caperan et al. |
| 6,322,614 | B1 | 11/2001 | Tillmans |
| 6,447,574 | B1 | 9/2002 | Frier, Jr. et al. |
| 7,493,816 | B1 * | 2/2009 | Petrovic ............... G08B 17/10 340/630 |
| 7,674,620 | B2 | 3/2010 | Totey et al. |
| 7,674,630 | B2 | 3/2010 | Siversson |
| 8,454,716 | B2 | 6/2013 | Sedillo |
| 11,291,939 | B1 * | 4/2022 | Luthe ..................... C02F 1/001 |
| 2002/0194988 | A1 | 12/2002 | Betting et al. |
| 2003/0200864 | A1 | 10/2003 | Meegan, Jr. |
| 2004/0226437 | A1 | 11/2004 | Stenersen et al. |
| 2006/0037916 | A1 | 2/2006 | Trampler |
| 2008/0181828 | A1 | 7/2008 | Kluck |
| 2009/0283480 | A1 | 11/2009 | Schadler et al. |
| 2011/0171090 | A1 | 7/2011 | Johnson et al. |
| 2012/0267288 | A1 | 10/2012 | Chen et al. |
| 2012/0325727 | A1 | 12/2012 | Dionne et al. |
| 2015/0265961 | A1 * | 9/2015 | Davey ..................... B01D 51/08 96/389 |
| 2016/0059206 | A1 | 3/2016 | Chen et al. |
| 2016/0339360 | A1 | 11/2016 | Lipkens et al. |
| 2018/0346348 | A1 | 12/2018 | Collins et al. |
| 2019/0060811 | A1 | 2/2019 | Reuben |
| 2019/0070528 | A1 * | 3/2019 | Luthe ..................... B01D 49/006 |
| 2020/0009286 | A1 | 1/2020 | Zarcone et al. |
| 2021/0341370 | A1 | 11/2021 | Luthe et al. |
| 2024/0051833 | A1 * | 2/2024 | Guo ......................... H05H 1/46 |

FOREIGN PATENT DOCUMENTS

| | | |
|---|---|---|
| CN | 1334897 | 2/2002 |
| CN | 1982781 | 6/2007 |
| CN | 102183033 | 9/2011 |
| CN | 104363996 | 2/2015 |
| CN | 204619662 | 9/2015 |
| CN | 205669422 | 11/2016 |
| CN | 108093625 | 5/2018 |
| CN | 108368737 | 8/2018 |
| DE | 19513603 | 10/1996 |
| DE | 19846115 | 4/2000 |
| DE | 69705226 | 9/2001 |
| DE | 69628389 | 4/2004 |
| DE | 102009036948 | 2/2011 |
| EP | 0923410 | 6/2001 |
| EP | 0773055 | 5/2003 |
| EP | 3916315 | 12/2021 |
| GB | 460795 | 2/1937 |
| JP | S 59154151 | 9/1984 |
| JP | 07047259 | 2/1995 |
| JP | H09122480 | 5/1997 |
| JP | 2004042044 | 2/2004 |
| JP | 2018-134612 | 8/2018 |
| KR | 101442486 | 9/2014 |
| RU | 2740899 | 1/2021 |
| WO | WO92/09354 | 6/1992 |
| WO | WO00/00294 | 1/2000 |
| WO | WO2011/152796 | 12/2011 |
| WO | WO2017/153038 | 9/2017 |
| WO | WO2017/154804 | 9/2017 |
| WO | WO2020/078577 | 4/2020 |
| WO | WO2020/164792 | 8/2020 |

OTHER PUBLICATIONS

K. W. Lee, et al., "On the Minimum Efficiency and the Most Penetrating Particle Size for Fibrous Filters," Journal of the Air Pollution Control Association, vol. 30, No. 4, pp. 377-381, Apr. 1980.

Günter Oberdörster, et al., "Nanotoxicology, An Emerging Discipline Evolving from the Studies of Ultrafine Particles," Environmental Health Perspectives, vol. 113, No. 7, pp. 823-839, Jul. 2005.

Günter Oberdörster, et al., "Toxicology of nanoparticles: A historical perspective," Nanotoxicology, vol. 1, No. 1, pp. 2-25, Mar. 2007.

Australian Government—IP Australia, Examination Report No. 1 in Australia Patent Application No. 2017229176, Nov. 30, 2021.

State Intellectual Property Office of People's Republic of China, First Office Action in Chinese Patent Application No. 201980081404.9, Mar. 25, 2022 (uncertified English language translation).

State Intellectual Property Office of People's Republic of China, First Office Action in Chinese Patent Application No. 201780027747.8, Aug. 19, 2020 (uncertified English language translation).

State Intellectual Property Office of People's Republic of China, Second Office Action in Chinese Patent Application No. 201780027747.8, May 10, 2021 (uncertified English language translation).

State Intellectual Property Office of People's Republic of China, Third Office Action in Chinese Patent Application No. 201780027747.8, Sep. 29, 2021 (uncertified English language translation).

State Intellectual Property Office of People's Republic of China, Fourth Office Action in Chinese Patent Application No. 201780027747.8, Feb. 21, 2022 (uncertified English language translation).

Korean Intellectual Property Office, Office Action in Korean Application No. 10-2018-7028414, Oct. 28, 2021 (uncertified English language translation).

Japan Patent Office, Office Action in Japanese Patent Application No. 2018-547927, Feb. 17, 2021 (uncertified English language translation).

Japan Patent Office, Office Action in Japanese Patent Application No. 2018-547927, Jul. 13, 2021 (uncertified English language translation).

Madimir N. Khmelev et al., "The Limits of Fine Particle Ultrasonic Coagulation," Symmetry 2021, 13, 1607, https://doi.org/10.3390/svm13091607, MDPI (https://www.mdpi.com/journal/symmetry), Sep. 1, 2021.

Sergey Kapishnikov, et al., "Continuous particle size separation and size sorting using ultrasound in microchannel," Journal of Statistical Mechanics: Theory and Experiment, vol. 2006, Issue 01, p. 01012, IOP Publishing Ltd, https://doi.org/10.1088/1742-5468/2006/01/P01012, Jan. 2006.

German Patent and Trade Mark Office, Office Action for German Patent Application No. 102016002599.9, Nov. 15, 2016 (German language original and partial uncertified English translation).

German Patent and Trade Mark Office, Office Action for German Patent Application No. 102016002600.6, Dec. 2, 2016 (German language original and partial uncertified English translation).

European Patent Office (as International Searching Authority), Written Opinion for International Application No. PCT/EP2005/000285, Sep. 25, 2017 (German language original and uncertified English translation).

Brazil Patent and Trademark Office, Office Action for Brazilian Patent Application No. BR112018067809-0, May 6, 2021 (Portuguese language original and partial uncertified English translation).

United States Patent and Trademark Office, Office Action in U.S. Appl. No. 16/082,521, filed Sep. 21, 2021.

United States Patent and Trademark Office, Office Action in U.S. Appl. No. 16/082,521, filed Jul. 11, 2022.

(56) References Cited

OTHER PUBLICATIONS

Eurasian Patent Office, Office Action in Eurasian Patent Application No. 202191015, Jan. 28, 2022 (uncertified English language translation).
Eurasian Patent Office, Office Action in Eurasian Patent Application No. 20189196031, Jan. 29, 2020 (uncertified English language translation).
Eurasian Patent Office, Office Action in Eurasian Patent Application No. 20189196031, May 29, 2020 (uncertified English language translation).
Eurasian Patent Office, Office Action in Eurasian Patent Application No. 20189196031, May 12, 2021 (uncertified English language translation).
Eurasian Patent Office, Office Action in Eurasian Patent Application No. 20189196031, Dec. 23, 2021 (uncertified English language translation).
European Patent Office (as International Searching Authority), International Search Report for International Application No. PCT/EP2017/000285, Sep. 25, 2017 (German language original and uncertified English translation).
International Preliminary Report on Patentability in Application No. PCT/EP2017/000285, Sep. 11, 2018 (English translation and German language original).
International Preliminary Report on Patentability in Application No. PCT/EP2019/000293, Apr. 14, 2021 (English translation).
Australian Government—IP Australia, Examination Report No. 1 in Australian Patent Application No. 2017229176, Nov. 30, 2021.
International Search Report and Written Opinion in International Application No. PCT/CA2023/051011, Oct. 10, 2023.
"How to Choose Your Ductwork," Primex Vents, https://www.primexvents.com/how-to-choose-your-ductwork/, Feb. 24, 2016.
"Piezoelectric Speaker," https://en.wikipedia.org/wiki/Piezoelectric_speaker, Wikimedia Foundation, Inc., May 7, 2021.
Hou et al., Possibilities of Using Ultrasonic Resonators in the Purification of Nuclear Aerosol Particles. Proceedings of the 2016 $24^{th}$ International Conference on Nuclear Engineering, ICONE24. 2016. American Society of Mechanical Engineers. Year: 2016.
Lazerele, "New and Novel Technologies in Particulate Filtration," Naval Surface Warfare Center, Dahlgren Division, published 2006.
"HEPA," Wikipedia published Sep. 19, 2015, accessed at https://en.wikipedia.org/w/index.php?title=HEPA&oldid=681842084, Year 2015.

\* cited by examiner

APPARATUS AND METHODS FOR AIR FILTRATION OF HVAC SYSTEMS

This disclosure relates to filtration of a fluid flowing through a heating, ventilation or air conditioning ("HVAC") system to agglomerate particles in a fluid flowing through the HVAC system. Exemplary fluids may include gases (e.g., air) or liquids (e.g., water).

HVAC systems typically control temperature and humidity. HVAC systems may attempt to remove pollutants from fluids such as air. Pollutants may include particles suspended in a fluid. For example, air pollution is one of the world's largest environmental health threats, causing 8.8 million deaths every year. Exemplary air pollution may include pathogens and allergens, such as viruses, fungal spores, bacteria and pollen. Exemplary air pollution may include industrial pollutants, vehicle fumes and toxic gases, such as ozone, nitrous oxide and sulfur dioxide. Conventional solutions for removing pollutants from a fluid include passing the fluid through a filter.

However, non-HEPA filters, by themselves, regularly fail to remove smaller particles, especially particles smaller than 200 nanometers ("nm") in diameter. Even the most effective non-HEPA filters are not capable of catching particles with a particle size of 1 nm to <50 nm. Particles in this size range are easily deposited in the bronchi and alveoli of human lungs and are generally associated with high mortality and toxicity rates. Particles in the size range of 1 nm to <50 nm may cause diseases such as asthma, bronchitis, arteriosclerosis, arrhythmia, dermatitis, autoimmune diseases, cancer, Crohn's disease, and organic failure to thrive.

HEPA filters may be capable of catching such small particles. However, HEPA filters also increase the cost and lower the energy efficiency of moving air or another fluid through a HVAC system. HEPA filters may catch smaller particles and these smaller particles may fill spaces in the filter and impede fluid flow through the filter. As the HEPA filter catches unwanted particles, the HEPA filter may also impede the flow of desirable fluid elements. Increased power must be provided to move fluid through HVAC systems that utilize HEPA filters.

Attempting to move a gas or other fluid through HEPA filters may also increase noise generated by these systems. The noise may reach 80 decibels ("dB"). Systems that utilize HEPA filters typically include a pre-filter to catch larger particles. After the larger particles are caught by the pre-filter, the HEPA filter may catch the smaller particles. Thus, HEPA-based systems may require maintaining two filters.

Additionally, HEPA filters themselves generally need to be changed more frequently than relatively more porous filters. HEPA filters are expensive to replace, and used HEPA filters may add refuse to landfills. Additionally, changing a HEPA filter may cause exposure to particles previously trapped within the HEPA filter.

Furthermore, it may not be possible or practical to retrofit HEPA filters onto preexisting HVAC systems that were not originally designed to use them. Attempting to retrofit a preexisting HVAC system to utilize HEPA filters may require changing ductwork that services the preexisting HVAC system. The needed changes to the ductwork may not be practically implementable. For example, other structures may have been built around preexisting ductwork.

In view of the technical and mechanical drawbacks associated with conventional filtering technology, it would be advantageous to provide alternative apparatus and methods for removing harmful particles in a fluid flowing through HVAC systems. Such improved methods may include retrofitting preexisting HVAC systems.

SUMMARY OF THE DISCLOSURE

Provided herein are systems capable of agglomerating smaller particles in a fluid into larger particles. The larger, agglomerated particles may be easier to neutralize or remove from the air, other gas, or other fluid flowing through the HVAC system. The larger particles may be more easily trapped by more porous filters. Such larger particles may be denatured before they are trapped by a filter.

An exemplary method for agglomerating particles in air or another fluid may include exposing the fluid to acoustic waves. Exposing fluid to an acoustic wave may cause agglomeration of particles in the fluid. As the fluid flows past the acoustic wave, the acoustic wave may agitate the fluid, increasing contact among particles by causing particles in the fluid to collide. Increasing contact of the particles may cause the particles to agglomerate and form larger particles. After a collision, particles may be likely to adhere together due to meshing of irregular structures as well as intermolecular attraction forces. Thus, exposing the fluid to acoustic waves may increase the number of collisions among particles in the fluid and thereby increase the rate and quantity of agglomeration of particles in the fluid.

A particle agglomeration system for improving filtering efficacy of an HVAC system is provided. The system may be used to retrofit an existing HVAC system.

The particle agglomeration system may include a first printed circuit board (PCB). The particle agglomeration system may include a second PCB. The particle agglomeration system may include a frame. The frame may position the first PCB facing the second PCB. The frame may position the first and second PCBs at a fixed distance from one another.

The particle agglomeration system may include a third PCB. The particle agglomeration system may include a fourth PCB. The mentioned frame may position the third PCB facing the fourth PCB. The frame may position the third and fourth PCBs at a fixed distance from one another. The distance may be the same as the distance between the first and second PCBs. The distance may be different from the distance between the first and second PCBs.

The particle agglomeration system may include a sound generator. A sound generator may include electronic circuitry that generates one or more sound waves. The sound generator may be a micro-electromechanical system ("MEMS"), a piezo device, a speaker, a horn, or any other suitable component for generating a sound wave. An exemplary sound generator may be a piezoelectric sound generator.

An illustrative piezoelectric sound generator (hereinafter, "piezo") may include a ceramic element attached to a metal diaphragm. The ceramic element may utilize a piezoelectric effect to distort its shape and the shape of the metal diaphragm when a voltage is applied. The movement of the metal diaphragm may generate a sound wave.

BRIEF DESCRIPTION OF THE FIGURES

FIG. 1 shows an HVAC system which embodies systems according to the disclosure.

FIG. 2 shows an illustrative view of a prototype HVAC system.

FIG. 3 shows illustrative components 200 that may be used in a prototype particle agglomeration system.

FIG. 4A shows an illustrative prototype of a particle agglomeration system.

DETAILED DESCRIPTION

Figure 1:
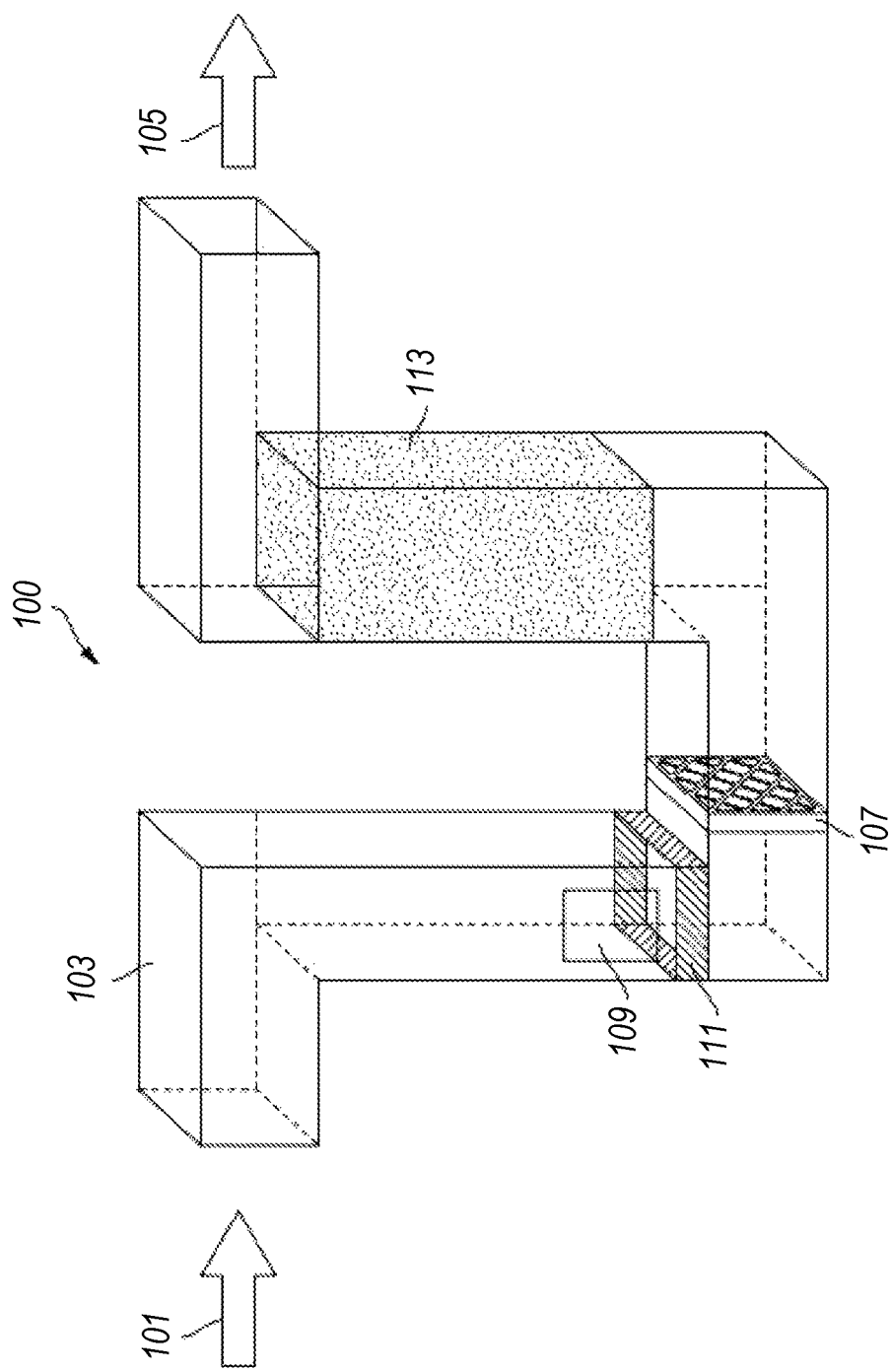

Provided herein are systems capable of agglomerating smaller particles in a fluid into larger particles. The larger, agglomerated particles may be easier to neutralize or remove from the air, other gas, or other fluid flowing through the HVAC system. The larger particles may be more easily trapped by more porous filters. Such larger particles may be denatured before they are trapped by a filter.

An exemplary method for agglomerating particles in air or another fluid may include exposing the fluid to acoustic waves. Exposing fluid to an acoustic wave may cause agglomeration of particles in the fluid. As the fluid flows past the acoustic wave, the acoustic wave may agitate the fluid, increasing contact among particles by causing particles in the fluid to collide. Increasing contact of the particles may cause the particles to agglomerate and form larger particles. After a collision, particles may be likely to adhere together due to meshing of irregular structures as well as intermolecular attraction forces. Thus, exposing the fluid to acoustic waves may increase the number of collisions among particles in the fluid and thereby increase the rate and quantity of agglomeration of particles in the fluid.

A particle agglomeration system for improving filtering efficacy of an HVAC system is provided. The system may be used to retrofit an existing HVAC system.

The particle agglomeration system may include a first PCB. The particle agglomeration system may include a second PCB. The particle agglomeration system may include a frame. The frame may position the first PCB facing the second PCB. The frame may position the first and second PCBs at a fixed distance from one another.

The particle agglomeration system may include a third PCB. The particle agglomeration system may include a fourth PCB. The mentioned frame may position the third PCB facing the fourth PCB. The frame may position the third and fourth PCBs at a fixed distance from one another. The distance may be the same as the distance between the first and second PCBs. The distance may be different from the distance between the first and second PCBs. The PCBs may be soldered to the frame.

The particle agglomeration system may include a sound generator. A sound generator may include electronic circuitry that generates one or more sound waves. The sound generator may be a micro-electromechanical system ("MEMS"), a piezo device, a speaker, a horn, or any other suitable component for generating a sound wave. An exemplary sound generator may be a piezoelectric sound generator.

An illustrative piezoelectric sound generator (hereinafter, "piezo") may include a ceramic element attached to a metal diaphragm. The ceramic element may utilize a piezoelectric effect to distort its shape and the shape of the metal diaphragm when a voltage is applied. The movement of the metal diaphragm may generate a sound wave.

The piezo may be capable of generating a sound wave. A sound wave generated by a piezo may have a frequency and/or audible volume that is outside the hearing range of humans and animals. The piezo may produce a sound wave in the ultrasound range. The ultrasound range may be between 20 KHz (kilohertz) and 10 MHz (megahertz).

Properties of a generated sound wave may be altered. The properties of the sound wave may be dynamically altered based on measured performance of an HVAC system. The properties of the sound wave may be controlled by an application operating on a mobile device.

A piezo or other sound generator may be mounted on a printed circuit board ("PCB"). Two or more sound generators may be mounted on a PCB. A first PCB may be affixed to a frame. A second PCB may be affixed to a frame. The frame may provide a structure for mounting the first and second PCBs. The PCBs may be soldered to the frame. The frame may be affixed within a ductwork of a preexisting HVAC system.

The sound generators may be arranged on the PCB in a row. The sound generators may be substantially round. The sound generators may abut one another. There may be a second parallel row on the same surface. The second row may be stacked upon the first row. There may be more than 2 rows on the PCB. The more than 2 rows may be stacked upon one another. There may be an opposing PCB with a piezo arrangement that mirrors the first arrangement. The arrangement may be any of the described arrangements. The first and second piezo boards may comprise sound generators arranged in one or more rows. The third and fourth piezo boards may comprise sound generators arranged in one or more rows. The system may have 8 boards, each having 15 sound generators. The 8 boards may be arranged as 4 sets of 2 boards each. The system may have 4 boards, each having 2 rows of 15 sound generators. The system may have any other suitable number of boards, rows, or sound generators.

The frame may provide a structure for mounting the first and second PCBs such that the first and second PCBs are spaced apart from each other. The PCBs may face one another. The sound-generating surfaces of the PCBs may face one another. The sound waves generated by the PCBs may thus form a standing wave.

The frame may include any suitable material or device that allows a first and second piezo PCB to be securely positioned a fixed distance apart from each other. The frame may include any suitable material or device that can be securely affixed to an inside of ductwork. The frame may include any suitable material or device that allows air, gas, or another fluid to pass through a space between the first and second PCB mounted on the frame, after the frame has been affixed within ductwork.

The frame may position a plate that includes a second PCB a fixed distance apart from the first PCB. The space between the first and second PCBs may form a channel. The frame may space the second PCB any suitable distance apart from the first PCB. For example, the frame may space a second PCB between 4-6 centimeters (cm.) apart from the first PCB. In such embodiments, the width of an illustrative channel may be between 4-8 cm. In other embodiments, the spacing is 4-6 cm.

An exemplary channel may include a first end and a second end. The HVAC system may include devices for moving air or another fluid through ductwork of the HVAC system. The fluid may be a gas. The fluid may be air. The fluid may be another fluid. For example, the HVAC system may include one or more fans or pumps that push or pull fluid through the one or more ducts of the HVAC system. The frame may be mounted in a duct of the HVAC system. The particle agglomeration system may include a collar. The collar may direct fluid flowing through the HVAC system through one or more of the channels. The collar may direct fluid through the first and second channel. A first collar may direct fluid through the first channel and a second collar through the second channel. The collar may direct fluid between the opposing pairs of PCBs. The HVAC system may be a preexisting HVAC system.

Air or another fluid moving through the duct may enter a channel at the first end of the channel. Fluid may exit the channel via the second end of the channel. The fluid may be exposed to a sound wave while flowing through the channel. The sound wave may agglomerate particles in the fluid.

A channel may have a length. The length may be determined by a dimension of the first PCB and/or the second PCB supported by the frame. The apparatus may include multiple channels. Each of the multiple channels may have a different length. Each of the multiple channels may have a different width. A channel may be straight, bent, curvilinear, or non-linear. At least one piezo in each channel may be configured to generate a sound wave. The sound wave generated in each channel may have different properties. Two or more sound waves may be generated in a channel. The sound waves generated in the channel may have different properties.

The apparatus may include 2 channels. Each channel may have a width of 4-6 cm. The channels may be adjacent, such that air can flow through them simultaneously. The channels may have unimpeded space between them. The unimpeded space may have a width of 3-5 cm.

Air or another fluid carried by ductwork may be directed to pass through the channel. The sound generated in a channel may propagate in any suitable direction with respect to fluid flowing through the channel. For example, a sound wave may propagate in a direction that is perpendicular to the flow path of the fluid through the channel. A longer length of a PCB, a larger number of sound generators mounted on the PCB, and/or a longer length of the opposing PCB (i.e., a longer length of the channel) may increase the amount of time a fluid passing through the channel is exposed to acoustic waves generated within the channel. A longer length of a PCB and/or a larger number of sound generators mounted on the PCB may increase the exposure time within the channel.

The PCB may be one of a plurality of PCBs. The frame may position each PCB a fixed distance apart from a corresponding one of the plurality of PCBs. Each pair of opposing PCBs may form a separate channel.

The apparatus may be configured to provide power to each PCB that is positioned in the frame. For example, the frame may include a cut-out that is configured to receive part of the PCB. The cut-out may be configured to mate with the PCB. The cut-out and PCB may include interlocking features that are configured to form a snap-fit that holds the PCB in the cut-out. The PCBs may be connected in series such the power routed to all the PCBs.

The cut-out may be configured to mate with the adjacent PCB. The cut-out and adjacent PCB may include interlocking features that are configured to form a snap-fit that holds the adjacent PCB in the cut-out.

The cut-out may be configured to mate with an opposing PCB. The cut-out and opposing PCB may include interlocking features that are configured to form a snap-fit that holds the opposing PCB in the cut-out.

The part of the PCB that sits in the cut-out may include an electrical contact. The apparatus may also include an electrical contact. A power supply may be connected to the PCB. The PCB may receive power via the electrical contact of the frame.

The frame may be configured to position two PCBs relative to one another such that a standing sound wave is formable between the PCBs when their sound generators each generate a sound wave.

The particle agglomeration system may include a particle sensor. The particle sensor may be configured to detect a level of particle agglomeration in air or another fluid processed by the HVAC system. The particle sensor may be configured to detect a level of particle agglomeration in a fluid flowing through the HVAC system. The particle sensor may detect a size of particles in fluid moving through the HVAC system.

The particle agglomeration system may include a controller. The controller may measure power drawn by a piezo mounted on a PCB in order to ensure the power is within a target range.

The frame may include cut-outs for holding the first and second PCB. The cut-out may include an electrical contact. The electrical contact may be configured to transfer electrical power to the PCB.

The frame may be a target-sized frame. The target-sized frame may be configured for installation into a target-sized duct of a HVAC system. The HVAC system may be a preexisting HVAC system. The target-sized frame may be rectangular and sized for installation into a rectangular HVAC ductwork. The ductwork may be a preexisting rectangular ductwork. Illustrative rectangular duct sizes may be between 7×18 cm. and up to 85×105 cm. The target sized frame may be round and sized for installation into a circular ductwork. The ductwork may be a preexisting circular ductwork. Illustrative circular duct sizes may be between 10 cm. to 104 cm. in diameter.

A particle agglomeration system for improving the filtering capacity of an HVAC system is provided. The HVAC system may be a preexisting HVAC system. The particle agglomeration system may include a first plate. The first plate may include a first sound generator. The first plate may include a first surface facing a space configured to form a channel when the plate is inserted into the frame. The first sound generator may be mounted on the first surface of the first plate.

The particle agglomeration system may include a second plate. The second plate may include a second sound generator. The second plate may include a first surface facing the same space as the first sound generator, when the plate is inserted into the frame. The second sound generator may be mounted on the first surface of the second plate. A standing sound wave may be formable between the first sound generator and the second sound generator.

Electric power may be transferred from the first PCB to the second PCB via an electrical connection. The size of an illustrative frame may be 4-6 cm. long by 4-6 cm. wide. For example, an illustrative frame may have a length of 6 cm. and a width of 6 cm.

The particle agglomeration system may include a frame. The frame may position the first plate relative to the second plate. The frame may hold the first and second plates at a fixed position within a duct of the HVAC system. The frame may space the first plate apart from the second plate such that a standing sound wave is formable between the first sound generator and the second sound generator.

The space between the first plate and the second plate may be a first channel. Air or another fluid moving through the HVAC system may be directed to flow through the first channel. Fluid flowing through the first channel may be exposed to a first standing sound wave formed between the first and second plates. The first standing sound wave may agglomerate particles in the fluid.

There may also be include a third and fourth plates. The space between them may form a second channel. Air or another fluid moving through the HVAC system may be directed to flow through the second channel. The third and fourth plates may each have an array of sound generators facing one another, similar to the first and second plates.

Figure 5:
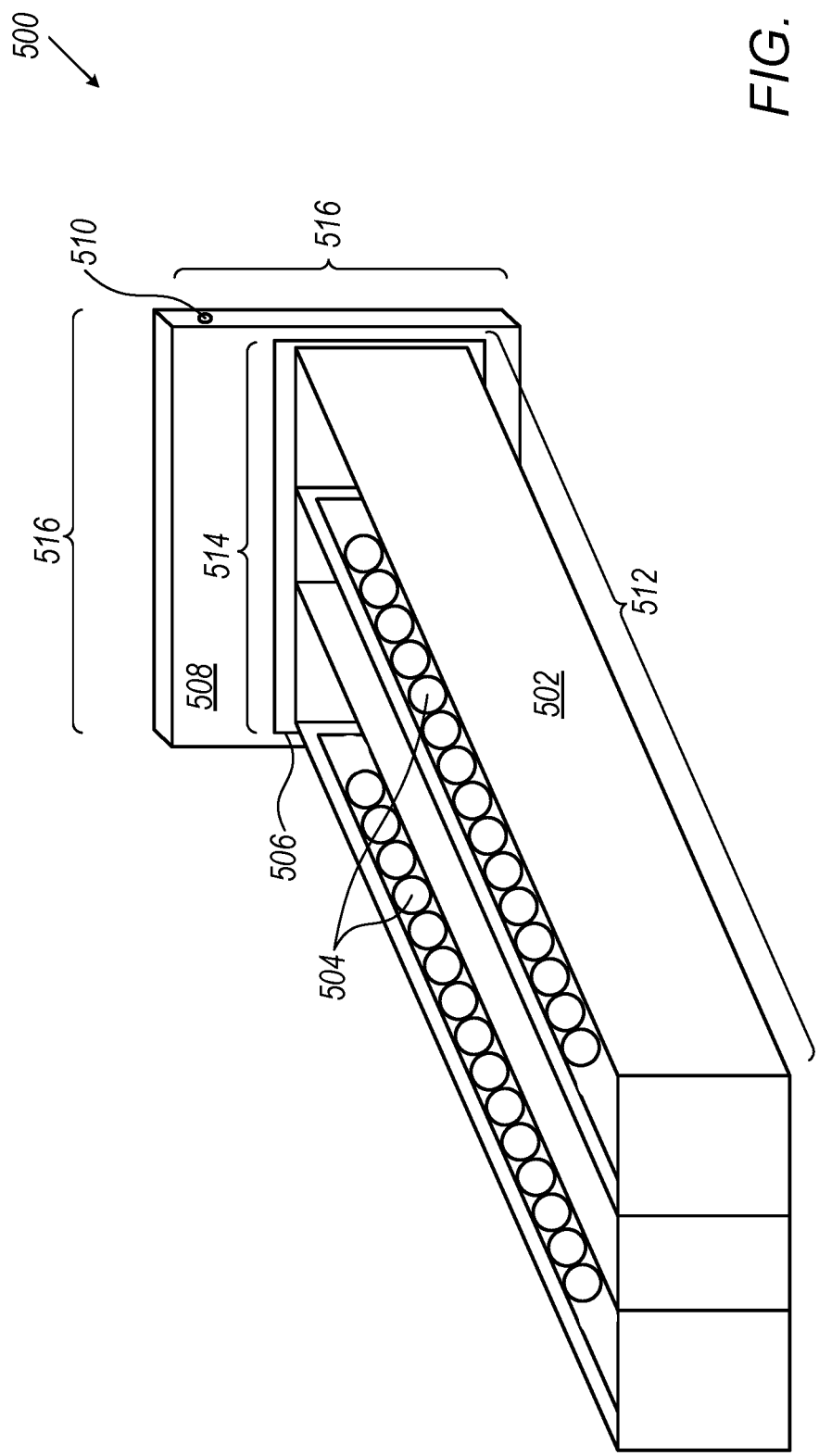
FIG. 5 shows an arrangement of 2 rows of sound generators.
Figure 6:
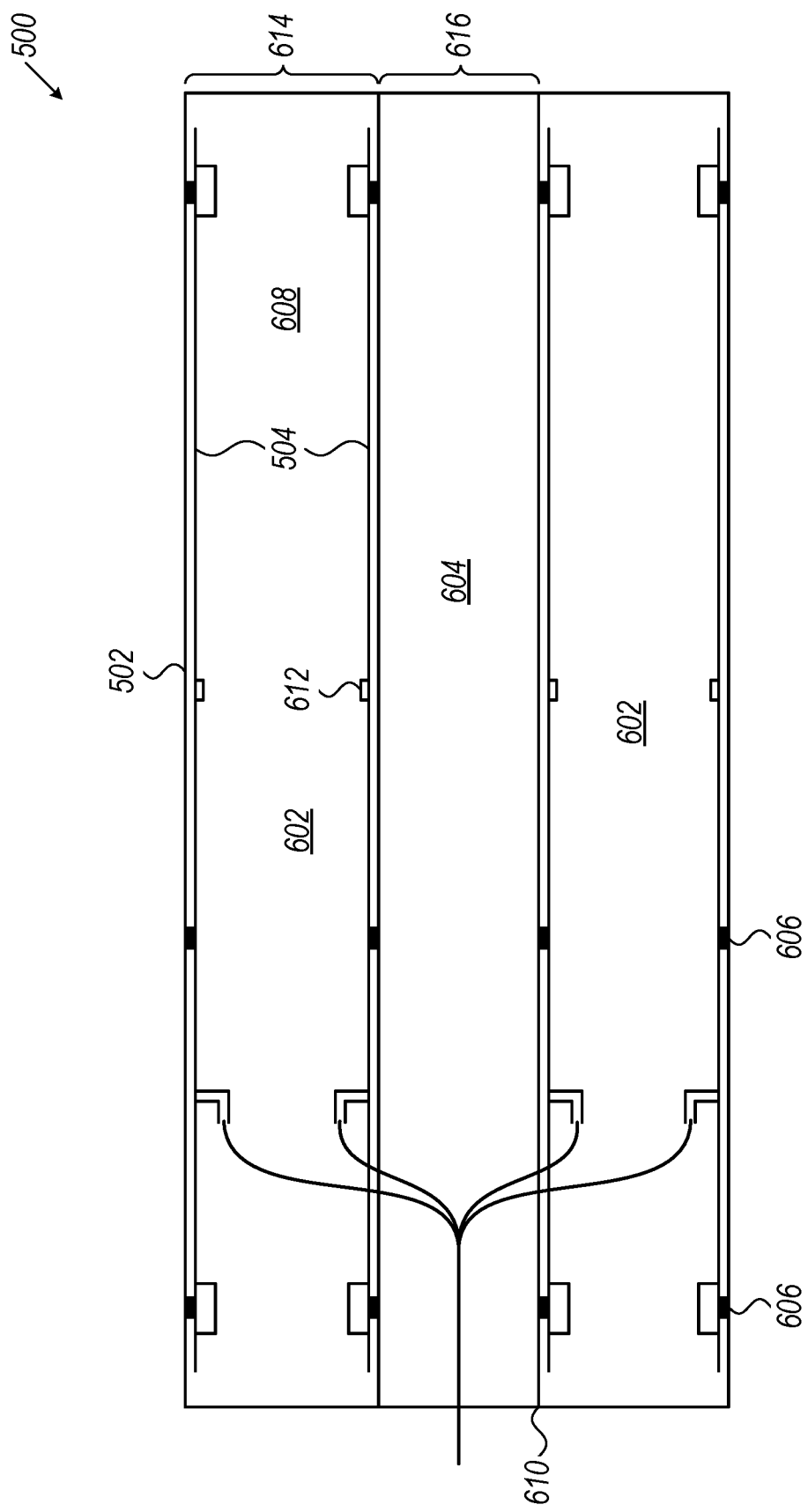
FIG. 6 depicts a perspective view of an HVAC filtering apparatus.

The system may include 8 PCBs arranged in 4 pairs of opposing PCBs. They system may include 2 parallel channels. The 2 parallel channels may be arranged as shown in FIGS. 5-6. Each channel may include an upstream pair of PCBs and a downstream pair of PCBs. The channels may have a total of 8 boards, each having 15 sound generators. The channels may have 4 boards, each having 2 rows of 15 sound generators. The 4 boards may be depicted as shown in FIGS. 5-6. The system may have any other suitable number of boards, rows, or sound generators.

Fluid flowing through the second channel may be exposed to a second standing sound wave formed between the third and fourth plates. The second standing sound wave may agglomerate particles in the fluid.

The particle agglomeration system may include a particle sensor. The sensor may determine the concentration of particles in air or another fluid flowing through the HVAC system. The particle agglomeration system may include a controller. The controller may process input captured by the sensor.

Air or another fluid moving through the HVAC system may be directed to flow through the second channel. Fluid flowing through the second channel may be exposed to a second standing sound wave formed between the third and fourth plates. The second standing sound wave may agglomerate particles in the fluid.

The frame may be configured to position the first and second plates such that the first and second sound generators are configured to emit first and second sound waves that propagate toward the opposing plate. The frame may be configured to position the first and second plates such that the first and second arrays of sound generators are configured to emit first and second sound waves that propagate toward the opposing plate. The frame may be configured to position the third and fourth plates such that the third and fourth sound generators are configured to emit third and fourth sound waves that propagate toward one another. The frame may be configured to position the third and fourth plates such that the third and fourth arrays of sound generators are configured to emit third and fourth sound waves that propagate toward one another. The first and second sound waves may propagate in opposite directions from the third and fourth sound waves. The first and second sound waves may propagate in the same direction as the third and fourth sound waves.

The particle agglomeration system may include fifth and sixth plates. The fifth and sixth plates may, when inserted into the frame, form a third channel. The channel may allow air or another fluid to flow unimpeded. The third channel may be between the mentioned first and second channel. The three channels may function to allow parallel/simultaneous air flow therethrough. The frame may hold the six plates at fixed positions within a duct of the HVAC system.

A method of assembling an HVAC system with enhanced filtration is provided. A method of retrofitting a HVAC system is provided. The method may include assembling a frame that is sized to fit into a duct of the HVAC system. The method may include positioning a first plate into the frame. The first plate may include a sound generator. The method may include positioning a second plate into the frame. The second plate may include a second sound generator. The first and second plates may include opposing arrays of sound generators, as described herein.

The method may include positioning a third plate into the frame. The third plate may include a third sound generator. The method may include positioning a fourth plate into the frame. The fourth plate may include a fourth sound generator. The third and fourth plates may include opposing arrays of sound generators, as described herein.

The method may include arranging 8 PCBs in 4 pairs of opposing PCBs. They arrangement may create 2 parallel channels. The 2 parallel channels may be arranged as shown in FIGS. 5-6. Each channel may include an upstream pair of PCBs and a downstream pair of PCBs.

The PCBs may be positioned in the frame, prior to securing the frame to the duct.

The method may include securing the frame to the duct. The frame may be secured to the duct using a cover plate. The cover plate may be connected to the duct and the frame connected to the cover plate. The frame may be secured to the duct using any suitable methods or fasteners. Illustrative fasteners may include tape, bolts, screws, and/or zip ties.

The method may include creating a hole in a duct of the HVAC system. The hole may be cut into the duct. After creating the hole, the method may include positioning the frame in the duct. The method may include filling a gap between the frame and a wall of the duct. The duct wall may be an outside perimeter wall of the duct. The gap may be filled with any suitable material. Illustrative gap-filling material may include adhesive-backed tape or foam strips. After positioning the frame in the duct, the method may include covering the hole with an access panel. The access panel may be opened to access the frame mounted in the duct. The access panel, when closed, may prevent air from leaking out of the duct. The access panel may be closed in an airtight manner.

The method may include connecting the frame to a controller. The controller may regulate a power supply to a sound generator mounted in the frame.

A method of agglomerating particles in air or another fluid passing through an HVAC system is provided. The HVAC system may be a preexisting system. The method may include generating a standing sound wave between the first plate and the second plate. The method may include passing air through the standing sound wave and agglomerating particles in the air. The method may include filtering the air to remove the agglomerated particles.

The method may include generating a standing sound wave between the first plate and the second plate. The standing sound wave may be generated by powering a piezo mounted on the first plate that generates a sound wave directed towards an opposing piezo mounted on the second plate. The method may include generating a standing sound wave between the first plate and the second plate by powering a first piezo mounted on the first plate and a second piezo mounted on the second plate. The first piezo may be positioned opposite the second piezo. Sound waves generated by the first and second sound generators may interfere with each other to form a standing sound wave.

The method may include generating a standing sound wave between the third and fourth plates. The standing sound wave may be generated by powering a piezo mounted on the third plate that generates a sound wave directed towards an opposing piezo mounted on the fourth plate. The method may include generating a standing sound wave between the third and fourth plates by powering a third piezo mounted on the third plate and a fourth piezo mounted on the fourth plate. The third piezo may be positioned opposite the fourth piezo. Sound waves generated by the third and fourth sound generators may interfere to form a standing sound wave.

The described systems may include a filter. The filter may have any suitable Minimum Efficiency Reporting Value ("MERV"). For example, filter 107 may be a high-performance EPA particle filter, a HEPA filter, or a ULPA (Ultra-Low Particulate Air) high-performance filter. The apparatus and methods described herein for retrofitting a preexisting HVAC system 100 with a particle agglomeration system may reduce clogging or replacement frequency of filter 107. The particle agglomeration system may reduce the total number of particles in air or another fluid carried by preexisting HVAC system 100, thereby reducing the need for dense filters and extending the usable life of any filter 107 used in preexisting HVAC system 100.

As used herein, the term high-performance EPA filter refers to a filter that removes at least 85% of particles in a size range of 0.1-0.25 microns. The EPA filter may be an E10, E11, and/or E12 filter. These filters may remove 85%, 95%, or 99.5% of particles, respectively.

As used herein, the term HEPA filter refers to a filter that removes at least 99.999% of 0.3-micron particles. Typically, the filter also removes at least 99.97% of particles larger than 0.3 microns.

As used herein, the term ULPA filter refers to a Type F and/or Type K ULPA filter. A Type F ULPA filter removes 99.999% of contaminants either between 0.1 microns and 0.2 microns or between 0.2 microns and 0.3 microns. A type K ULPA filter removes 99.995% of particles from 0.1 to 0.2 microns or from 0.2 to 0.3 microns.

The described PCBs may include a printed circuit board (PCB). Properties of a sound wave generated by a piezo mounted on the circuit board may be controlled by a combination of Boolean logic gates included in the circuit board. The Boolean logic gates may be embedded in the circuit board. Properties of the sound wave may be determined by a crystal oscillator mounted on the PCB. Amplitude of the sound wave may be determined by the power amplitude.

The circuit board may be separated from the frame using standoffs. The thickness of the standoff may be 1-3 mm. The circuit board may be separated from the frame using a slide-in rail. The thickness of the slide-in rail may be 1-3 mm.

Also provided herein is an HVAC system. The system may include any of the described particle agglomeration systems. The system may include a filter. The filter may be downstream of the particle agglomeration system. The system may include ductwork. The system may include a fan.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method and/or apparatus described herein.

Apparatus embodiments may omit features shown and/or described in connection with illustrative apparatus. Apparatus embodiments may include features that are neither shown nor described in connection with illustrative apparatus. Features of illustrative apparatus embodiments may be combined. For example, an illustrative apparatus embodiment may include features shown or described in connection with any other illustrative apparatus and/or method embodiment described herein.

FIG. 1 shows an HVAC system 100 that embodies conceptual design systems according to the disclosure. Return air flow 101 may enter system 100 and flow through ductwork 103. Return air 101 may flow through filter 107. After passing through filter 107, return air 101 may be processed by HVAC components 113. For example, HVAC components 113 may heat or cool return air 101. After processing by HVAC components 113, supply air 105 may be pushed out of system 100 into an ambient environment.

FIG. 1 also shows that system 100 has been retrofit to agglomerate particles in return air 101. A hole 109 may be cut in ductwork 103. Frame 111 may be inserted through hole 109 and mounted inside ductwork 103. Sub-components 203 of frame 111 may be inserted into hole 109. The inserted sub-components 203 may be linked inside ductwork 103 to form frame 111. Frame 111 may include one or more sound generators. One or more sound generators may be mounted on a PCB. The PCB may be affixed to frame 111. Frame 111 may include one or more opposing sound generators. Opposing sound generators may produce standing sound waves that agglomerate particles in return air 101. The agglomerated particles may be removed from return air 101 by filter 107.

Figure 2:
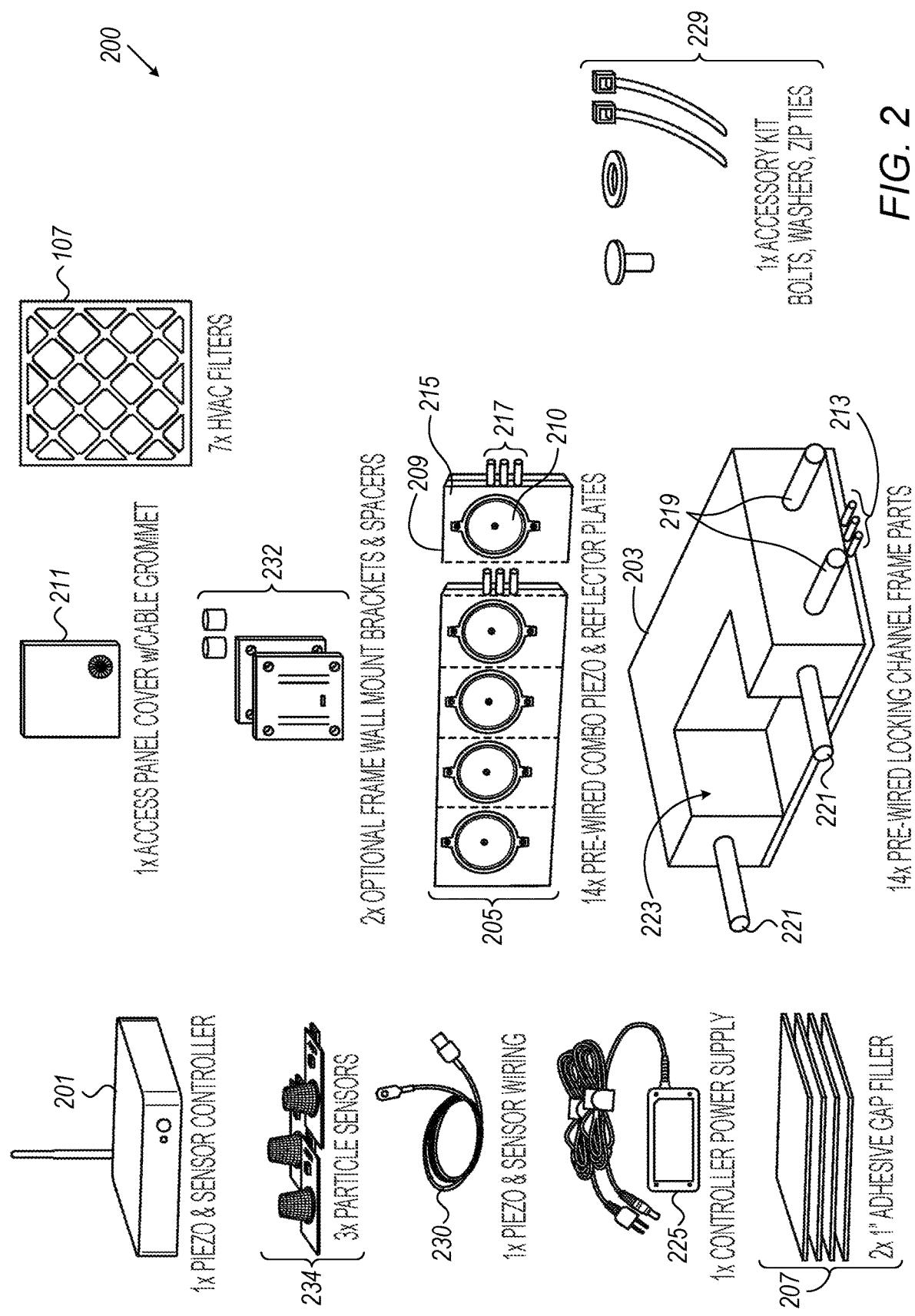

FIG. 2 shows illustrative components 200 that may be used in a design concept of HVAC system 100 (shown in FIG. 1). Components 200 include controller 201. Controller 201 may measure power drawn by a sound generator 210 of each module 209. Controller 201 may measure power drawn by one or more plates 205. The controller may adjust a property of a sound wave generated by sound generator 210. For example, controller 200 may alter the level of power supplied to sound generator 210. Controller 201 may adjust a power level supplied to sound generator 210 in response to the input captured by particle sensor 234.

FIG. 2 shows that more than one particle sensor 234 may be installed in an HVAC system 100. Particle sensor 234 may detect a level of particle agglomeration in fluid processed by HVAC system 100. Particle sensor 234 may detect the size of particles in fluid moving through the HVAC system. Particle sensor 234 may detect the concentration of particles in fluid flowing through HVAC system 100.

Controller 201 may responsively adjust a property of a sound wave generated by sound generator 210 in response to detecting a target concentration of target size particles in fluid flowing through HVAC system 100. Components 200 may include wiring 230 for connecting controller 201 to sensor 234. Wiring 230 may also be used to connect controller 201 to frame 111.

Components 200 may include power supply 225. Power supply 225 may be a power source for controller 201, particle sensor 234, frame 111, plate 205, and/or a module 209. Components 200 may include a gap filler material. Gap filler material may be used to prevent fluid from passing between plate 205 and the wall of ductwork 103 and avoiding exposure to sound waves. Gap filler material may include an adhesive for affixing material to sub-components 203 and/or a wall of ductwork 103.

Components 200 may include access panel cover 211. Access panel cover 211 may be used to cover a hole cut in ductwork 103. Access panel cover 211 may be opened to gain access to frame 111 mounted in preexisting HVAC system 100. Components 200 may include brackets and/or spacers 232 for mounting frame 111 in ductwork 103 of HVAC system 100.

Components 200 may include plate 205. Plate 205 may include module 209. Plate 205 may be composed of a plurality of modules. Each module 209 may include a sound generator 210. Sound generators 210 may be mounted on each opposing edge of the module 209. Each module 209 may include protrusions 217. Protrusions 217 may be configured to mate with correspondingly sized receptacles a neighboring module 209. When protrusions 217 are positioned in a corresponding receptacle, two or more modules 209 may be linked to each other and configured for electrical communication. FIG. 2 shows that sound generator 210 may be mounted on bracket 215.

Components 200 may include sub-component 203 of frame 111. Sub-component 203 may include protrusions 219. Protrusions 219 may be configured to mate with correspondingly sized receptacles of a neighboring sub-component 203. Mating protrusions 219 with correspondingly sized receptacles of a neighboring sub-component 203 may link the two sub-components.

Sub-component 203 may include protrusions 221. Protrusions 221 may be configured to mate with correspondingly sized receptacles of a neighboring sub-component 203. Mating protrusions 221 with correspondingly sized receptacles of a neighboring sub-component 203 may link two sub-components 203.

Sub-component 203 may include protrusions 213. Protrusions 213 are configured to mate with correspondingly sized receptacles of a neighboring sub-component 203. Mating protrusions 213 with correspondingly sized receptacles of a neighboring sub-component 203 may link two sub-components 203. When protrusions 213 are positioned in a correspondingly sized receptacle of a neighboring sub-component 203, power, communication or any other electrical signals may be transferred from one sub-component 203 to a neighboring sub-component 203.

In some embodiments, the mating of protrusions 219 or 221 with a correspondingly sized receptacle of a neighboring sub-component 203 may also allow power or any other electrical signals to be transferred from one sub-component 203 to the neighboring sub-component 203. Protrusions 213, 219 or 221 may form a snap-fit with correspondingly sized receptacle of a neighboring sub-component 203.

FIG. 2 shows that sub-component 203 includes cut-out 223. Module 209 (e.g., at an end of plate 205) may be configured to be seated in cut-out 223. Sub-component 203 and module 209 may include features that create a snap-fit or any other suitable technique for keeping module 209 seated in cut-out 223.

Components 200 include filter 107 (shown in FIG. 1). Filter 107 may have any suitable Minimum Efficiency Reporting Value ("MERV"). For example, filter 107 may be a high-performance EPA particle filter, a HEPA filter, or a ULPA (Ultra-Low Particulate Air) high-performance filter. The apparatus and methods described herein for fitting HVAC system 100 with a particle agglomeration system may reduce clogging or replacement frequency of filter 107. The particle agglomeration system may reduce the total number of particles in a fluid carried by preexisting HVAC system 100, thereby reducing the need for dense filters and extending the usable life of any filter 107 used in preexisting HVAC system 100.

Filter 107 may remove agglomerated particles. Return air 101 moving through preexisting HVAC system 100 may be passed through filter 107 before supply air 105 is released into an ambient environment. Because, when fitted with a particle agglomeration system, particles in return air 101 have been agglomerated, a more porous filter (e.g., for filtering particles >400 nm) may be used effectively. A more porous filter may require less energy to push air or other fluids through filter 107.

Components 200 may include fasteners 229. Fasteners 229 may be used to secure frame 111 to ductwork 103. Fasteners 229 may include bolts, washers, zip ties and any other suitable fasteners.

Figure 3:
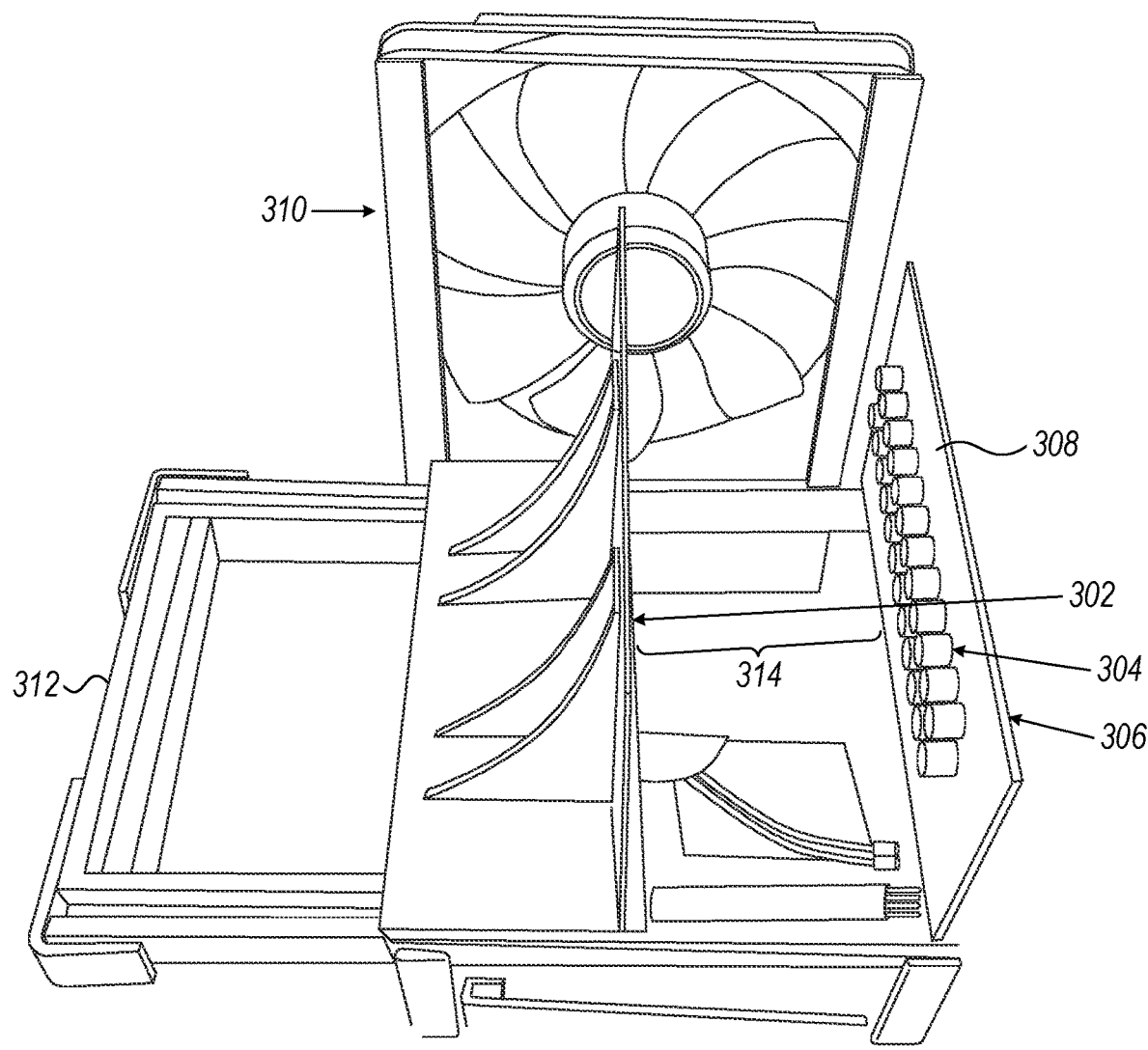

FIG. 3 shows an illustrative prototype of a particle agglomeration system 300 used to show proof of concept for an agglomeration system intended to retrofit a preexisting HVAC system. FIG. 3 shows an illustrative frame. The frame supports a first surface 302. The surface contains a first array of sound generators (not depicted) that is spaced apart from a second array of sound generators 304 mounted on piezo bracket 306 on a second surface 308. A fan 310 pushes air through the ductwork. Components are supported by frame 312. A channel 314 is formed between first and second surfaces 302, 308. The piezo bracket may include a circuit board. Properties of a sound wave generated by a piezo mounted on the circuit board may be controlled by a combination of Boolean logic gates included in the circuit board. The Boolean logic gates may be embedded in the circuit board.

Figure 4A:
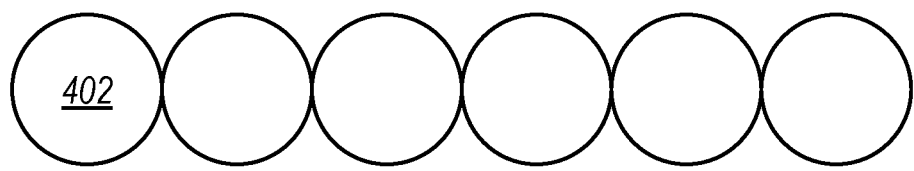
FIG. 4B shows another illustrative prototype of a particle agglomeration system.

FIG. 4A shows a row 401 arrangement of substantially round sound generators 402 that abut one another.

Figure 4B:
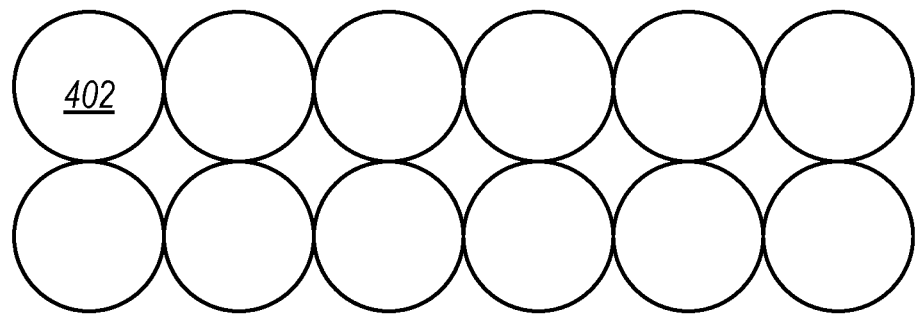

FIG. 4B shows an arrangement 403 of 2 rows of substantially round sound generators 402 that are stacked upon one another.

FIG. 5 depicts a perspective view of HVAC filtering apparatus 500, including frame 502, PCB assemblies 504, gasket 506, and access panel 508, including cable grommet 510. Frame 502 has outer length 512 of 502 mm. and outer width 514 of 197 mm. The depicted design may have 8 boards per HVAC unit, each having 15 sound generators, a standoff thickness (see FIG. 7) of 2 mm, and a PCB thickness of 1.6 mm. Outer dimensions 516 of access panel 508 are both 210 mm.

FIG. 6 depicts a top view of HVAC filtering apparatus 500, including frame 502, PCB assemblies 504, channels 602, unimpeded space 604 between channels 602, standoffs 606, piezo sensor 608, cover plate side 610, and board connector 612. A slide-in rail may be used instead of standoffs 606 to separate PCB assemblies 504 from frame 502. The depicted design may have 48 mm width 614 of channels 602, and width 616 of empty space.

Thus, apparatus and methods have been provided for filtering fluids flowing through HVAC systems. Persons skilled in the art will appreciate that the present disclosure can be practiced by other than the described embodiments, which are presented for purposes of illustration rather than of limitation.

What is claimed is:

1. A particle agglomeration system for agglomerating a fluid in a heating, ventilation and air conditioning ("HVAC") system, the HVAC system comprising a duct, the duct having a rectangular shape, the duct having at least one dimension transverse to a direction of fluid flow through the duct of not less than 18 centimeters ("cm"), the particle agglomeration system comprising:
- a first printed circuit board (PCB), the first PCB comprising a first array of piezoelectric sound generators;
- a second PCB, the second PCB comprising a second array of piezoelectric sound generators;
- a first channel between the first and second PCBs;
- a third PCB, the third PCB comprising a third array of piezoelectric sound generators;
- a fourth PCB, the fourth PCB comprising a fourth array of piezoelectric sound generators;
- a second channel between the third and fourth PCBs;
- a target-sized frame that:
  - positions the first PCB facing the second PCB at a first fixed distance therebetween, the first fixed distance being between 4 cm and 6 cm, the first fixed distance being oriented along the at least one dimension of the duct;
  - positions the third PCB facing the fourth PCB at a second fixed distance therebetween, the second fixed distance being between 4 cm and 6 cm, the second fixed distance being oriented along the at least one dimension of the duct; and
  - defines an unimpeded space, the unimpeded space having a third fixed distance therebetween, the third fixed distance being between 3 cm and 5 cm, the third fixed distance being oriented along the at least one dimension of the duct.

2. The particle agglomeration system of claim 1, wherein the target-sized frame is one of a plurality of target-sized frames.

3. The particle agglomeration system of claim 1, wherein the system is configured to provide power to the first and second PCBs when the first and second PCBs are positioned in the target-sized frame.

4. The particle agglomeration system of claim 1, wherein the target-sized frame is configured to position the first PCB relative to the second PCB such that a standing sound wave is formable between the first PCB and the second PCB.

5. The particle agglomeration system of claim 1, further comprising a particle sensor.

6. The particle agglomeration system of claim 5, further comprising a controller, wherein the controller adjusts a property of the system in response to an input captured by the particle sensor.

7. The particle agglomeration system of claim 5, wherein the particle sensor is configured to detect a level of agglomeration of particles in the fluid processed by the HVAC system.

8. The particle agglomeration system of claim 7, wherein the input captured by the particle sensor comprises a particle size in the fluid flowing through the HVAC system.

9. The particle agglomeration system of claim 1, wherein the piezoelectric sound generators are each configured to produce a sound wave in an ultrasound range.

10. The particle agglomeration system of claim 1, wherein the piezoelectric sound generators of the first, second, third, and fourth PCBs are arranged in at least one row.

11. The particle agglomeration system of claim 1, wherein the target-sized frame fits inside a lumen of the duct of the HVAC system.

12. The particle agglomeration system of claim 1, further comprising a standoff disposed between the target-sized frame and the PCB.

13. The particle agglomeration system of claim 1, further comprising a slide-in rail disposed between the target-sized frame and the PCB.

14. The particle agglomeration system of claim 1, wherein the fluid is a gas.

15. The particle agglomeration system of claim 1, wherein the target-sized frame comprises cut-outs for holding the first and second PCB.

16. The particle agglomeration system of claim 1, further comprising a collar that directs air flow between the first and second PCBs.

17. A particle agglomeration system for improving filtering capacity of a heating, ventilation and air conditioning ("HVAC") system, the HVAC system comprising a duct, the duct having a rectangular shape, the duct having a first dimension transverse to a direction of fluid flow through the duct of not less than 7 centimeters ("cm") and a second dimension transverse to the direction of fluid flow through the duct of not less than 18 cm, the particle agglomeration system comprising:
- a first plate comprising a first sound generator;
- a second plate comprising a second sound generator;
- a first channel between the first and second plate;
- a third plate comprising a third sound generator; and
- a fourth plate comprising a fourth sound generator,
- a second channel between the third and fourth plate;
- a target-sized frame configured to:
  - position the first plate relative to the second plate at a first fixed distance such that a first standing sound wave is formable between the first sound generator and the second sound generator, the first fixed distance being between 4 cm and 6 cm, the first fixed distance being oriented along the second dimension of the duct;
  - position the third plate relative to the fourth plate at a second fixed distance such that a second standing sound wave is formable between the third sound generator and the fourth sound generator the second fixed distance being between 4 cm and 6 cm, the second fixed distance being oriented along the second dimension of the duct; and
  - define an unimpeded space between the first channel and the second channel, the unimpeded space having a third fixed distance therebetween, the third fixed distance being between 3 cm and 5 cm, the third fixed distance being oriented along the second dimension of the duct.

18. A method of retrofitting a heating, ventilation and air conditioning ("HVAC") system, the HVAC system comprising a duct, the duct having a rectangular shape, the duct having at least one dimension transverse to a direction of fluid flow through the duct of not less than 18 centimeters ("cm"), the method comprising:
- assembling a target-sized frame that is sized to fit into the duct;
- positioning a first plate comprising a first sound generator into the target-sized frame;
- positioning a second plate comprising a second sound generator into the target-sized frame; and
- positioning a third plate comprising a third sound generator into the target-sized frame;
- positioning a fourth plate comprising a fourth sound generator into the target-sized frame; and
- securing the target-sized frame to the duct;

wherein:
- the first and second plates are positioned at a first fixed distance such that a first channel is formed therebetween, the first fixed distance being between 4 cm and 6 cm, the first fixed distance being oriented along the at least one dimension of the duct;

the third and fourth plates are positioned at a second fixed distance such that a second channel is formed therebetween, the second fixed distance being between 4 cm and 6 cm, the second fixed distance being oriented along the at least one dimension of the duct; and
an unimpeded space is defined, the unimpeded space having a third fixed distance therebetween, the third fixed distance being between 3 cm and 5 cm, the third fixed distance being oriented along the at least one dimension of the duct.

* * * * *